UNITED STATES PATENT OFFICE.

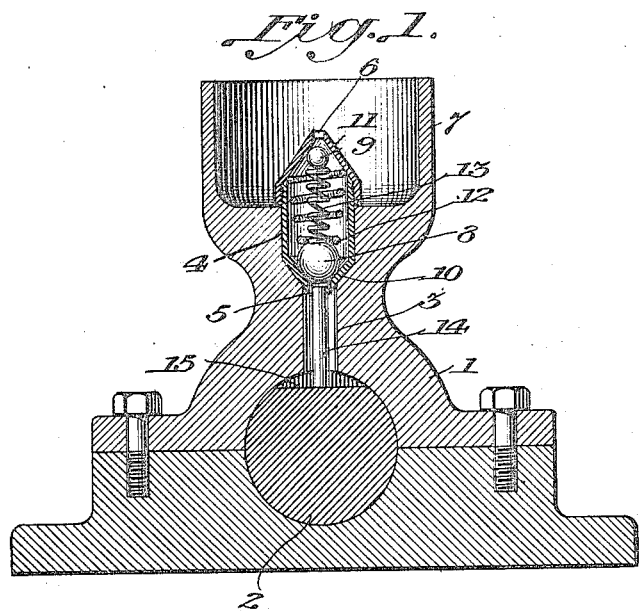
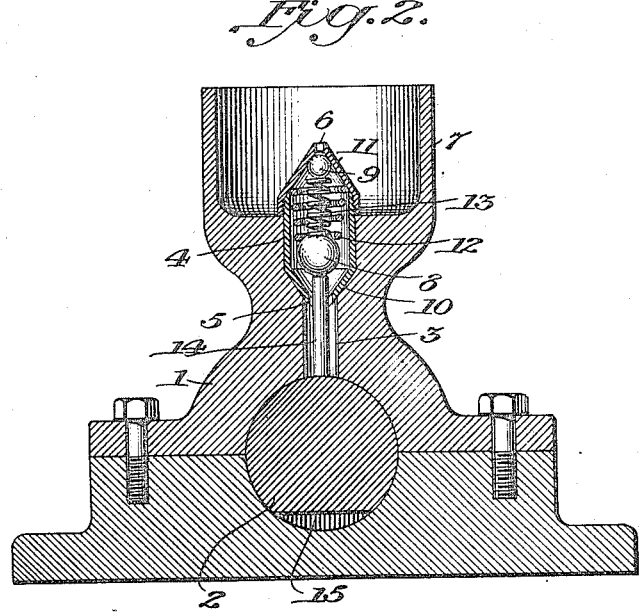

HENRY FISCHER HOWARD, OF CHATTANOOGA, TENNESSEE, ASSIGNOR TO SOUTHERN WELL WORKS COMPANY, OF BEAUMONT, TEXAS, A CORPORATION OF TEXAS.

SELF-FEEDING LUBRICATOR.

1,187,528.

Specification of Letters Patent.

Patented June 20, 1916.

Application filed June 20, 1913. Serial No. 774,910.

*To all whom it may concern:*

Be it known that I, HENRY F. HOWARD, a citizen of the United States, residing at Chattanooga, in the county of Hamilton and State of Tennessee, have invented certain new and useful Improvements in Self-Feeding Lubricators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in lubricating devices, and it consists more particularly in an arrangement of valves adapted for combination with the bearing of some movable part, *e. g.* rotating shaft, and operable to maintain an adequate supply of lubricant to the part to be lubricated so long as said part is in motion but to automatically interrupt the flow of lubricant and thereby prevent loss or waste thereof when the part to be lubricated is at rest.

The principal object of the invention is to provide a device of simple, inexpensive and compact nature for efficiently serving the purposes stated.

An embodiment of the invention is illustrated in the accompanying drawing wherein:—

Figures 1 and 2 are sectional views illustrating a practical application of the improved lubricating device and different operative relations of the parts thereof.

Similar characters of reference designate corresponding parts in both of the views.

The drawings show a lubricating device in which the features of the invention are incorporated as applied to a bearing 1 for a shaft 2, the bearing having a duct 3 through which lubricant is conducted to said shaft.

In the embodiment shown the lubricating device is fitted directly over the outer end of the duct 3 and includes a casing 4 having an oil discharge orifice 5 at its inner end and an oil intake orifice 6 at its outer end, the oil being supplied to said casing through the inlet 6 from any suitable source of supply, *e. g.* an oil cup or reservoir 7 which may be formed as a part of the bearing 1.

The discharge of oil through the orifice 5 is controlled by a valve 8 and the intake of oil through the orifice 6 is controlled by a valve 9. The valves 8 and 9 are preferably of ball form and the ends of the casing 4 are cone-shaped to provide seats 10 and 11 respectively for said valves. The valve 8 is urged to its seat by a spring 12, preferably an expansive coil spring and a similar spring 13, lighter than the other, located within the spring 12 constitutes an operative connection between the valves 8 and 9 and urges the latter to close the orifice 6 consequent to the opening of the valve 8.

The valve 8 is reciprocated during the action of the movable part, *e. g.* the shaft 2, and for this purpose a stem 14 may be employed as an operative connection between said shaft and said valve. The stem 14 is disposed in the duct 3 and its outer end engages the valve 8 while its inner end engages the shaft 2. The latter has a flattened portion 15 which permits of the inward movement of the stem 14 and therewith of the valve 8 during a period of the rotation of said shaft.

The valves 8 and 9 are so related that the one will be open when the other is closed and the opening and closing movements of the valve 9 are controlled by the movements of the valve 8. The range of movement of the valve 9 is very small and but a very slight movement of the valve 8 from its seat 10 is required to effect the seating of the valve 9. For these reasons there is no substantial liability of the two valves being simultaneously open. Inasmuch as one or the other of the valves will be closed at virtually any period in the running of the shaft there will be no loss of waste of lubricant when the shaft is at rest.

The operation will be readily apparent from the foregoing description.

During the rotation of the shaft the valve 8 will be reciprocated, the spring 12 closing the valve when the stem 14 engages the flattened portion 15, and the curved surface of the shaft acting through the stem 14 to open said valve against the tension of its spring. The valve 8 in its movement to close the orifice 5 permits the opening of the valve 9 but in its movement to uncover the orifice 5 effects the closing of the valve 9 through the agency of the spring 13. When the valve 8 is closed and the valve 9 is open oil will pass into the casing 4 through the orifice 6 and when the valve 9 is closed and the valve 8 is open oil will discharge from said casing through the orifice 5, the oil so discharging flowing through the duct 3 to the part to be lubricated. It follows that measured charges of oil are intermittently fed to the shaft 2 during the rotation thereof and proportionately to the speed of rotation. When the shaft 2 comes to rest the supply of oil thereto will be automatically terminated since one of the valves, it matters not which, will be in closed relation, as previously explained.

Having fully described my invention, I claim:—

1. A lubricating device comprising a casing having an inlet and an outlet for oil, valves controlling inlet and outlet, a spring acting on the outlet valve to close the same, a second spring forming an operative connection between the valves and permitting of the opening of the inlet valve when the outlet valve is closed while causing the closing of the inlet valve by the opening movement of the outlet valve, in combination with a moving part to be lubricated and a connection operated by said moving part for reciprocating the outlet valve and thereby effecting opening and closing movements thereof.

2. A lubricating device comprising a casing have an inlet and an outlet for oil and having conical valve seats in which said inlet and outlet are formed, ball valves controlling said inlet and outlet, a spring acting on the outlet valve to close the same, a second spring forming an operative connection between the valves and permitting of the opening of the inlet valve when the outlet valve is closed while causing the closing of the inlet valve by the opening movement of the outlet valve, in combination with a moving part to be lubricated and a connection operated by said moving part for reciprocating the outlet valve and thereby effecting opening and closing movements thereof.

In testimony whereof I affix my signature in presence of two witnesses.

HENRY FISCHER HOWARD.

Witnesses:
GLENN H. MONTFORT,
C. A. YOUNG.